US008841791B2

(12) United States Patent
Booth

(10) Patent No.: US 8,841,791 B2
(45) Date of Patent: Sep. 23, 2014

(54) ACCESS MEANS FOR AN ELECTRICAL MACHINE

(75) Inventor: James Kenneth Booth, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 88 days.

(21) Appl. No.: 13/443,255

(22) Filed: Apr. 10, 2012

(65) Prior Publication Data

US 2012/0263602 A1    Oct. 18, 2012

(30) Foreign Application Priority Data

Apr. 15, 2011 (EP) .................................... 11162609

(51) Int. Cl.
| | | |
|---|---|---|
| F03D 9/00 | (2006.01) | |
| F01D 5/30 | (2006.01) | |
| H02K 5/04 | (2006.01) | |
| H02K 7/18 | (2006.01) | |
| H02K 5/22 | (2006.01) | |
| H02K 15/00 | (2006.01) | |
| F03D 1/00 | (2006.01) | |

(52) U.S. Cl.
CPC ............... *H02K 5/22* (2013.01); *F01D 5/3092* (2013.01); *H02K 5/04* (2013.01); *Y02E 10/725* (2013.01); *H02K 7/1838* (2013.01); *H02K 15/0006* (2013.01); *F03D 1/003* (2013.01)
USPC .................................... 290/44; 290/45; 52/40

(58) Field of Classification Search
USPC .................... 290/44, 55; 52/40; 361/600, 807
See application file for complete search history.

(56) References Cited

U.S. PATENT DOCUMENTS

| | | | | |
|---|---|---|---|---|
| 5,254,876 A | * | 10/1993 | Hickey ............................ | 290/55 |
| 6,774,504 B1 | * | 8/2004 | Lagerwey ........................ | 290/44 |
| 6,975,045 B2 | * | 12/2005 | Kurachi et al. .................. | 290/44 |
| 7,239,036 B2 | * | 7/2007 | D'Atre et al. ................... | 290/44 |
| 7,845,693 B2 | * | 12/2010 | Li et al. .......................... | 292/288 |
| 8,018,081 B2 | * | 9/2011 | Calley ............................. | 290/44 |
| 2005/0082836 A1 | | 4/2005 | Lagerwey | |
| 2011/0138699 A1 | * | 6/2011 | Niehues et al. .................. | 52/40 |
| 2012/0025529 A1 | * | 2/2012 | Davis et al. ..................... | 290/44 |

FOREIGN PATENT DOCUMENTS

| | | | |
|---|---|---|---|
| DE | 102008050848 A1 | | 4/2010 |
| EP | 2143943 A1 | | 1/2010 |

OTHER PUBLICATIONS

European Search Report dated Jan. 25, 2012, 10 pages.

* cited by examiner

*Primary Examiner* — Basil Katcheves

(57) ABSTRACT

An access means for providing access to components within a stationary housing arrangement of an electrical machine with a stationary part and a rotatable part includes an arrangement of permanent fixtures arranged on the stationary housing arrangement of the electrical machine. Further, an electrical machine with a stationary part and a rotatable part is provided, which electrical machine includes such an access means arranged in a stationary housing arrangement of the electrical machine. Also, a wind turbine with such an electrical machine is provided.

13 Claims, 5 Drawing Sheets

ACCESS MEANS FOR AN ELECTRICAL MACHINE

CROSS REFERENCE TO RELATED APPLICATIONS

This application claims priority of European Patent Office Application No. 11162609.9 EP filed Apr. 15, 2011. All of the applications are incorporated by reference herein in their entirety.

FIELD OF INVENTION

An access means, an electrical machine, and a wind turbine are provided.

SUMMARY OF INVENTION

A large electrical machine such as a generator or motor is generally enclosed inside a housing, which can serve to protect components of the machine from weather, dirt etc. For example, the electrical generator of a wind turbine is enclosed inside a nacelle mounted on a tower. An electrical machine can comprise many different kinds of auxiliary devices or components such as the fans and pipes of a cooling system, a monitoring system, a lubrication systems, electrical circuitry, etc. Many of these components or systems need maintenance at intervals. For a relatively small machine, it is usually no problem to access all these parts. However, in the case of a large electrical machine, where for example the diameter of the generator may easily reach or exceed 2-6 meters, it is difficult to reach certain parts inside the machine without further equipment, which must be taken into the housing in order to access the parts to be serviced. For example, one or more ladders may be required by a maintenance worker or service personnel to reach a component. During maintenance, the electrical machine is turned off or shut down. In this down time, the maintenance work can be carried out. After the maintenance is completed, any additional gear taken into the housing must be removed again. However, transport of this additional equipment is time-consuming and therefore also costly. Furthermore, when unwieldy items such as ladders are moved around inside the confined housing, parts of the machine can be unintentionally damaged. If items of the additional equipment are overseen or forgotten inside the nacelle and the machine is made operational again, serious damage could occur when the forgotten items interfere with the moving parts of the electrical machine, for example the rotor or a lubricant hose.

A more efficient and safe way of providing maintenance access to an electrical machine, in particular to a generator of a wind turbine, inside a housing is provided by access means, an electrical machine and a wind turbine as claimed in the claims.

An access means for providing worker access to components within a stationary housing arrangement of an electrical machine, which comprises a stationary part and a rotatable part, comprises an arrangement of permanent fixtures arranged on the stationary housing arrangement of the electrical machine.

The access means provides that all elements required to provide a worker access to any component requiring maintenance are already present as permanent fixtures in the electrical machine. Any elements of the access means may be formed or machined in the stationary housing arrangement of the electrical machine well in advance of any maintenance procedure, for example even before the stationary housing arrangement is put into place about the electrical machine. This means that any later maintenance procedure may be carried out in a quick and efficient manner, since the maintenance workers do not have to transport any additional equipment such as ladders or scaffolding into the stationary housing arrangement. This is not only an improvement from the point of view of worker safety, but also reduces the risk of damage that can occur as a result of equipment mistakenly left in the stationary housing arrangement after a maintenance step, in contrast to known maintenance methods in which equipment such as ladders or scaffolding parts must be brought into and also removed from a housing.

An electrical machine comprises a stationary part and a rotatable part, and such an access means arranged in a stationary housing arrangement of the electrical machine.

A wind turbine comprises such an electrical machine. A maintenance procedure for such a wind turbine is then particularly straightforward, since the workers may simply enter the stationary housing arrangement, with only a minimum of equipment, for example only those tools required to carry out repairs, or any replacement parts. The workers do not need to first carry or lift ladders, scaffolding etc. into the stationary housing arrangement. Neither do they need to remove such equipment afterwards. This reduces the time required by the workers to prepare for and to conclude the maintenance procedure, and increases their safety. Since the overall time required for a maintenance procedure for a wind turbine can be considerably reduced, the overall cost of maintenance, for example for a wind park comprising many tens or even hundreds of wind turbines, may be considerably reduced also.

Embodiments and features are given by the dependent claims, as revealed in the following description. Features of different claim categories may be combined as appropriate to give further embodiments not described herein.

In an electrical machine, the stator and rotor may be arranged in a number of different ways relative to each other. For example, the stator can be arranged to enclose the rotor, or vice versa. The coils of an armature, i.e. the stator, can be arranged relative to the rotor across an air gap. The armature must be secured in some way relative to the field magnets of the moving rotor. In the case of a wind turbine, the entire generator is contained in a nacelle mounted on a tower. A stator housing is secured to the inside of the nacelle, and the armature coils are arranged in or on the stator housing so that they face the magnets across the narrow air gap.

In the following, without restricting in any way, it may be assumed that the electrical machine is an electrical generator of a wind turbine, particularly a direct-drive wind turbine, and that the stationary part is a stator secured inside a stationary housing arrangement inside the nacelle, and the rotatable part comprises a rotor.

In the case of a wind turbine, the blades of the wind turbine cause the rotor to rotate. In a direct-drive generator, the rotor is usually arranged to enclose the stator, i.e. the rotor moves around the stator. In a permanent magnet machine, the rotor is equipped with permanent magnets or field magnets arranged axially on its exterior.

In an embodiment, the stationary housing arrangement of the electrical machine is arranged about the rotatable part of the electrical machine, and a permanent fixture of the access means is arranged on a surface of the stationary housing arrangement. Here, the term "arranged about" is to be understood to mean that the stationary housing arrangement may be arranged to be enclosed by the rotor, or it may be arranged to enclose the rotor, and that the shape of the stationary housing arrangement essentially follows the shape of the rotor. The "surface" may be an interior or exterior surface of the stationary housing arrangement, depending on the arrangement of the rotor and stator relative to each other. Either way, the access means does not affect any part of the generator itself, since it is separate from the field magnets and the armature coils.

In some large wind turbine designs, the field and armature are arranged around an interior space or cavity, and this cavity allows access to an interior of the hub. Therefore, the stationary housing arrangement of the electrical machine comprises a sleeve arranged concentrically with the rotor, and a permanent fixture of the access means is arranged on an outside surface of the sleeve. In the case of a direct-drive generator, for example, the sleeve may be arranged within the rotor (i.e. the rotor is larger than the sleeve), and a longitudinal axis of the sleeve essentially coincides with a longitudinal axis of the rotor. A worker can move through the cavity to enter the hub. The permanent magnets of a rotor of a large generator can be in the region of two meters in length, while the diameter of the rotor can be in the region of 2-6 m or more. Therefore, any space between the sleeve and the rest of the stationary housing can be spacious enough to accommodate other parts or components such as a cooling system, a lubricating system, etc.

The stationary housing arrangement is essentially fixed and does not move during operation of the electrical machine. The idea is to make use of this fact and to exploit its stationary nature to allow access at any time to a region inside or behind the stationary housing arrangement, without having to carry or transport access equipment into and out of the nacelle. The stationary housing arrangement can have one or more access doorways or openings in a (usually vertical) stator flange to allow a worker to pass from one part of the nacelle to another part concealed behind the stationary housing arrangement. A permanent fixture of the access means comprises a number of essentially horizontal access platforms arranged on the sleeve of the stationary housing arrangement. For a large stator flange having a diameter of up to about 10 meters, these platforms, arranged at several levels, allow a worker convenient access to components in this relatively large space. In prior art designs, the worker would have to carry a ladder or other equipment and lift it through such an access opening in the stationary housing arrangement. After the maintenance procedure, he would have to ensure that any such equipment is removed again.

To move between platforms, in another embodiment, a system of rungs or steps could be arranged along a surface of the flange or sleeve, and gaps could be left to one or more sides of each platform to allow a worker to climb from one platform level to the next. The platforms could be arranged in a staggered manner about the sleeve, so that a worker can effectively step from one platform to another. However, any gaps to one or more sides of a platform may present a potential risk should a worker lose his balance or fall. Therefore, an access platform comprises a hatch or tiltable platform part in the body of the access platform for allowing worker access between a level below the access platform and a level above the access platform in an interior of the stationary housing arrangement. In this way, there is no need for any potentially hazardous gaps to the side(s) of the platform. The hatch may be designed so that, when it is closed, it presents a safe surface upon which the worker can stand.

A platform is essentially as wide as the sleeve. To ensure that a worker does not fall over an outer edge of a platform, this is preferably dimensioned to essentially fill an area between the sleeve and any side walls of the stationary housing arrangement or nacelle interior walls. A platform may also be designed to be tiltable about an axis, for example a horizontal axis, so that the platform could at least temporarily be moved 'out of the way' while maintenance work is being carried out, for example to allow a larger component to be moved through the stationary housing arrangement. Of course, to ensure workplace safety, such a tiltable platform would preferably comprise a reliable locking element to allow it to be securely locked in place on the stationary housing arrangement when being used as a platform to stand upon.

Other objects and features will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

In the diagrams, like numbers refer to like objects throughout. Objects in the diagrams are not necessarily drawn to scale.

Figure 1:
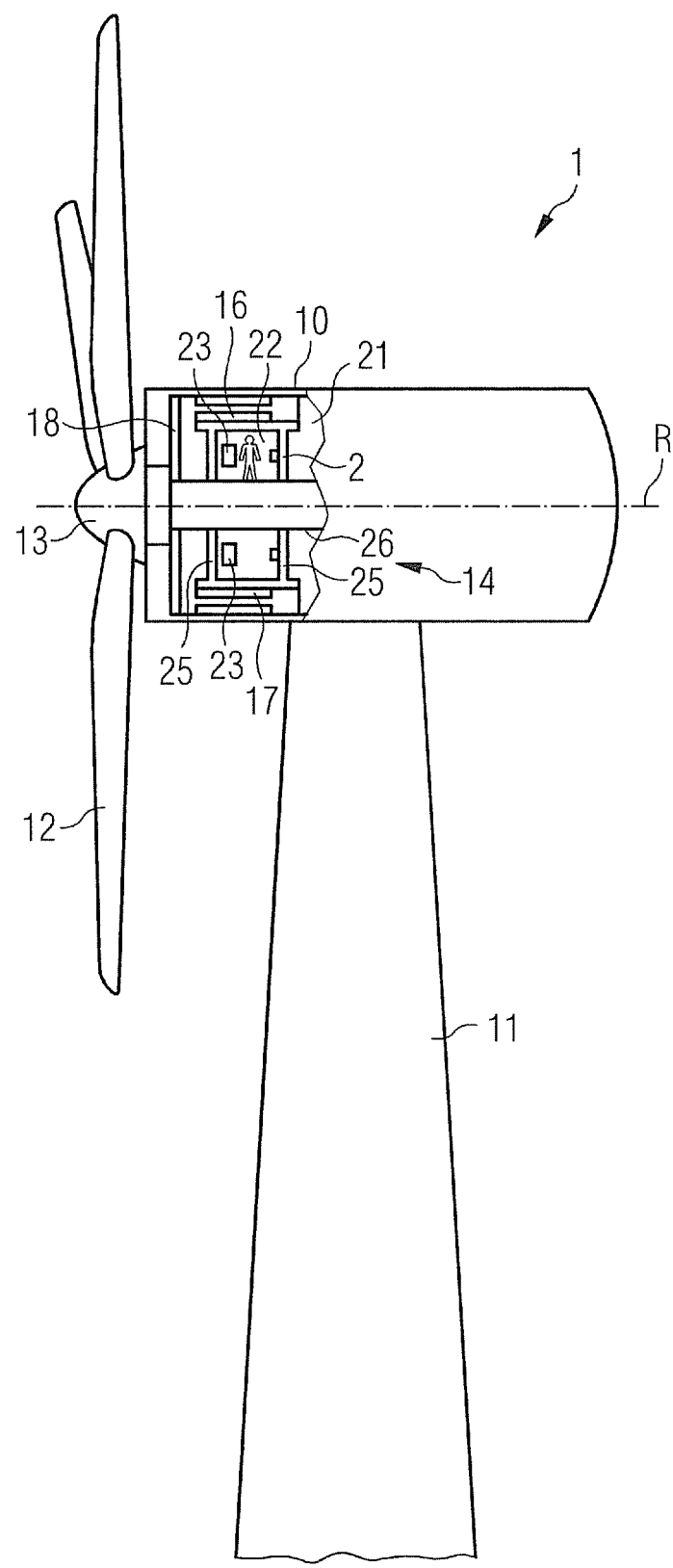
FIG. 1 shows a cross-section of part of an electrical generator in a nacelle of a wind turbine.

FIG. 1 shows a very simplified cross-section of part of an electrical generator 14 in a nacelle 10 of a wind turbine 1. The generator 14 is mounted on a bedplate (not shown) enclosed in the nacelle 10, which in turn is mounted on a tower 11, on land or offshore. The nacelle 10 can be entered by means of a ladder or elevator in the tower 11. Here, the generator 14 can be a permanent-magnet synchronous machine 14, or a generator using an electrically excited rotor. A rotor 17 is supported by a rotor flange 18, which is turned by the hub 13 and blades 12. The rotor 17 is arranged to move around a stator 16. The generator 14 is only indicated very schematically, and components such as a gearbox or circuitry for connecting to a grid are omitted for clarity.

The stator housing 2 comprises a sleeve 26 enclosing a central cavity (providing access to the hub 13) and a stator flange 25 that serves to anchor the heavy stator housing 2 securely in the nacelle 10. The outer diameter of the stator flange 25 can easily comprise 8-10 meters or more. The stator flange 25 effectively separates one region 21 of the nacelle interior, in which the rotating main shaft is contained, from another region 22 or cavity 22 behind the stator flange 25. To access any cooling equipment 23, lubricating equipment 23 or other components 23 (indicated by simple boxes) in that cavity 22, service personnel must take ladders and/or scaffolding into the nacelle 10 and into the cavity 22 of the stator housing 2, assemble them, and remove them again once the maintenance work has been completed.

Figure 2:
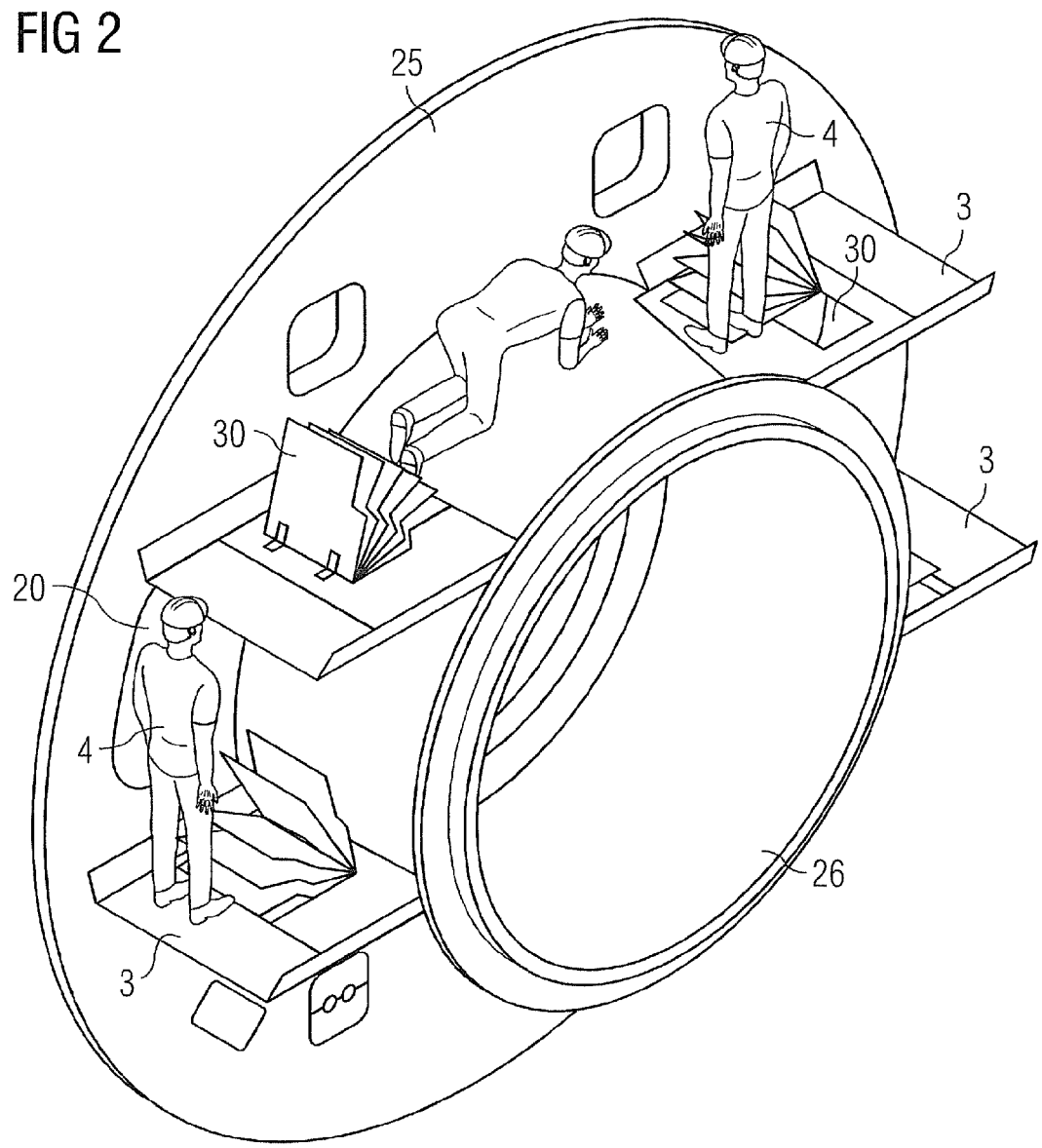
FIG. 2 shows an access means according to an embodiment.

FIG. 2 shows an access means 3, 30 according to an embodiment arranged on a sleeve 26 of a stator housing 2 of an electrical generator of a wind turbine. As the diagram shows, a number of conveniently placed platforms 3 are arranged on the sleeve 26. A platform 3 has an additional hatch 30 which can be opened to allow a worker 4 to pass through, and which can be closed to give the worker 4 a larger surface upon which to stand. The platforms 3 are arranged at levels appropriate for accessing any equipment (not shown) that needs to be serviced. Since the stator flange 25 and the sleeve 26 are stationary components, and there are no moving parts on this side of the stator flange 25, the platforms 3 can be permanently affixed to the sleeve 26, and also to the flange 25 if necessary, and do not have any effect on the generator during operation. A platform 3 can be made of any suitable material that can bear the load of one or more workers 4 and their maintenance tools. Steel could be a favorable choice if the sleeve 26 is also made of steel, as is usually the case. The platforms 3 may be welded to the sleeve 26 or connected in a straightforward manner using bolts or other suitable fasteners.

Figure 3:
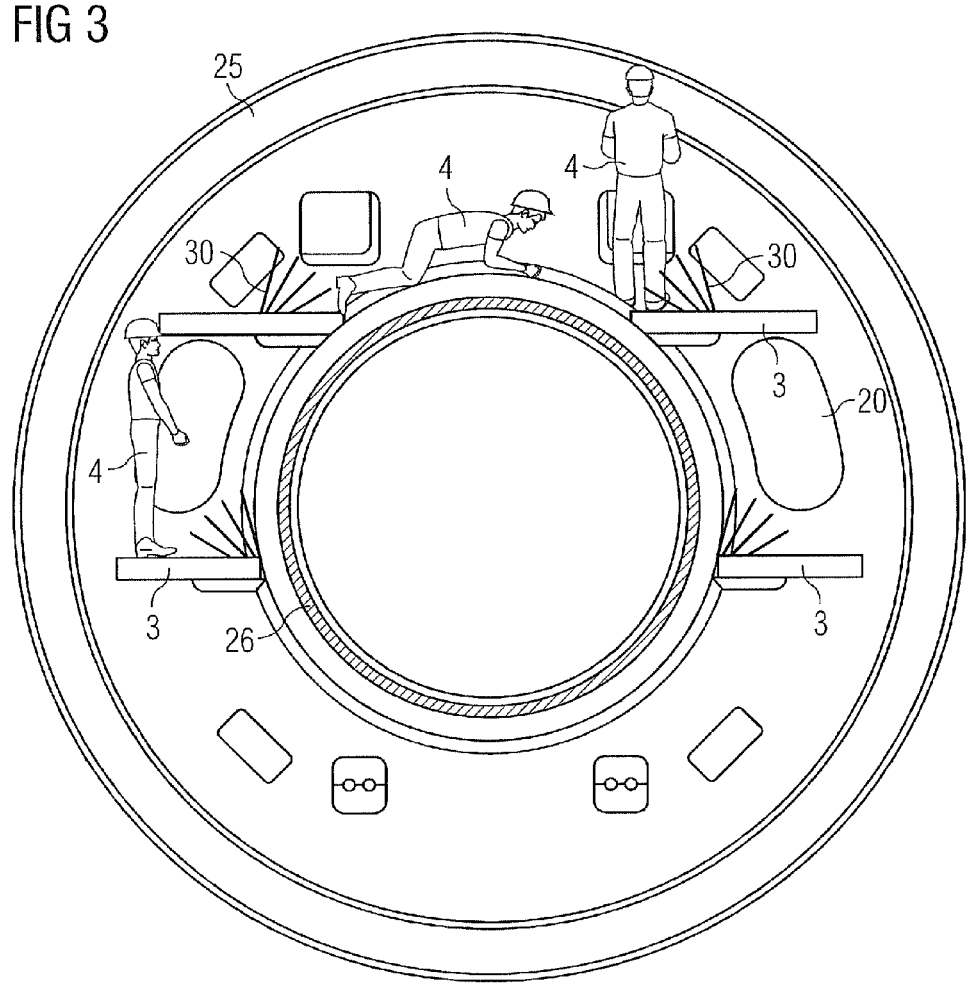
FIG. 3 is a front view of the access means of FIG. 1.

FIG. 3 is a front view of the access means 3, 30 of FIG. 1, showing the arrangement of the four platforms 3. Access to that side of the stator housing 2 can be through openings 20 arranged at a convenient level in the stator flange 25. For example, the openings 20 can be arranged at a level above the bedplate so that a service worker can easily step through without requiring a ladder.

Figure 4:
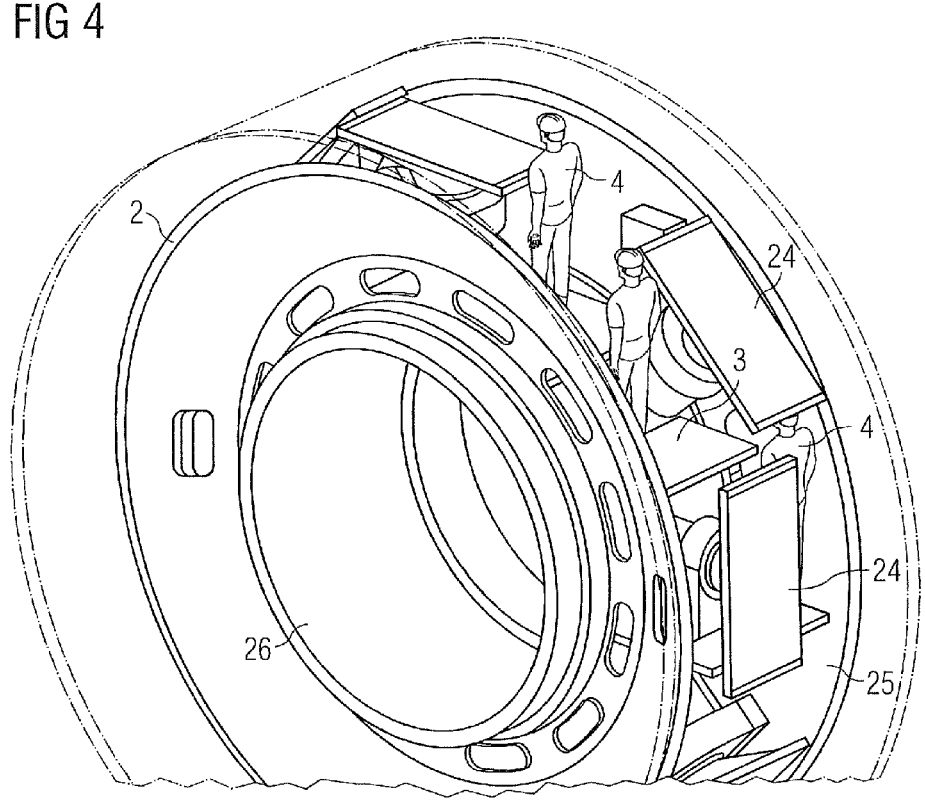
FIG. 4 shows an access means according to another embodiment.

FIG. 4 shows an access means 3 according to another embodiment. Here, platforms 3 are arranged at various levels and orientations on the sleeve 26. A worker 4 can easily access components in need of maintenance, for example panels 24 of a cooling system.

Figure 5:
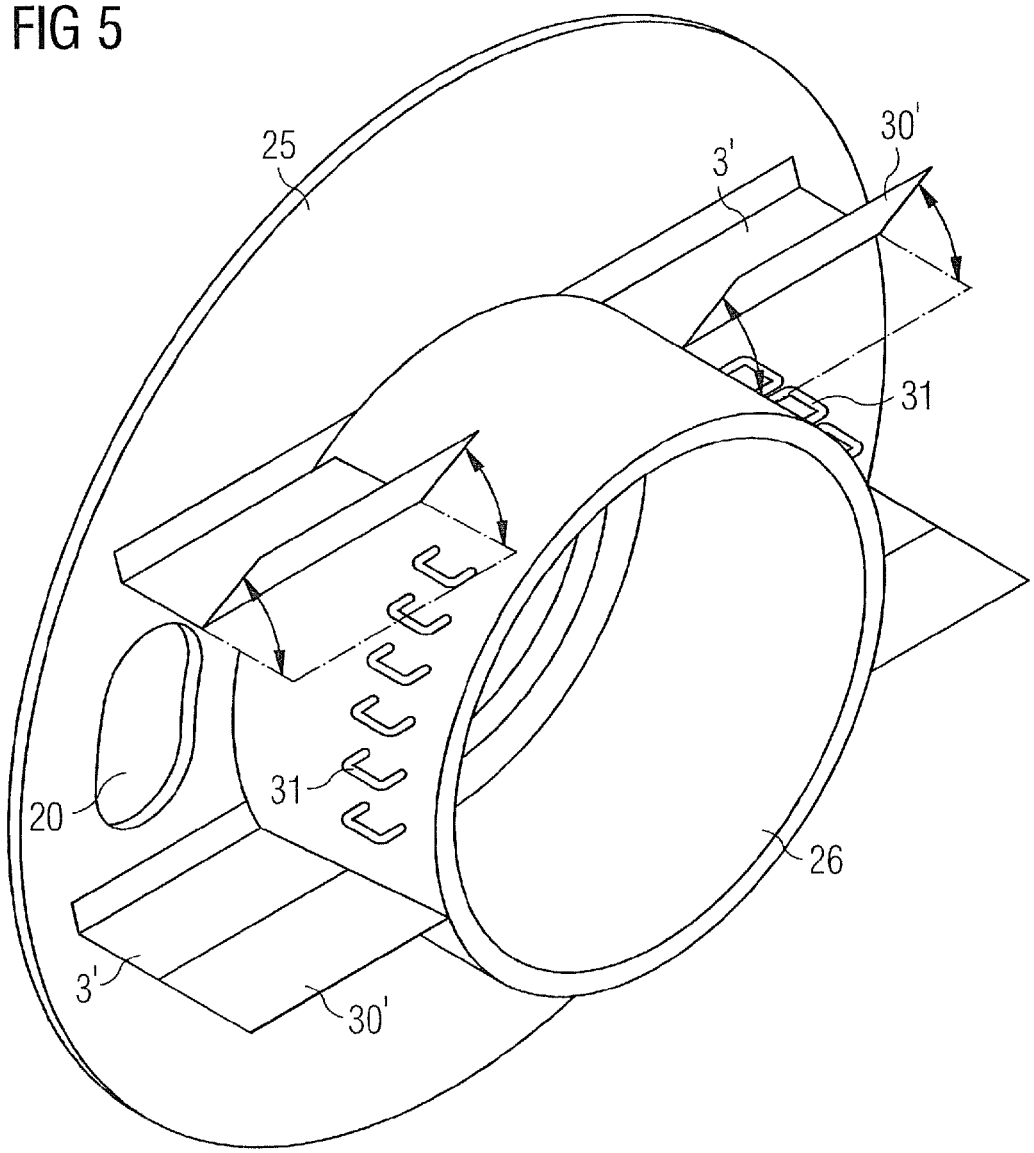
FIG. 5 shows an access means according to a further embodiment.

FIG. 5 shows an access means according to a further embodiment. Here, a combination of platforms 3' and rungs 31 is shown. Here, the platforms 3' have hatches 30' along their length and arranged above the rungs 31, so that a worker can comfortably pass through. The platforms 3' are dimensioned to essentially fill the space between sleeve 26, flange 25 and nacelle inside wall (not shown). The worker can also stand on the rungs 31 to access devices or components at essentially any level. Of course, the positions of the rungs 31 and hatches 30' could equally well be exchanged to give a reverse arrangement, depending on how the components requiring service are to be mounted in the cavity of the stationary housing arrangement.

It will be understood that numerous additional modifications and variations could be made to the access means, the electrical machine and the wind turbine without departing from the scope as disclosed. For example, the platforms need not have hatches, but could simply be arranged on the sleeve with enough space to one side so that a worker has enough room to climb onto or off the platform. Of course, safety measures should be taken to ensure that a worker cannot fall into the open space beside such a platform.

For the sake of clarity, it is to be understood that the use of "a" or "an" throughout this application does not exclude a plurality, and "comprising" does not exclude other steps or elements.

The invention claimed is:

1. A housing arrangement of an electrical machine comprising a stationary part and a rotatable part, the housing arrangement comprising:
   access means for providing access to components within the housing arrangement,
   wherein said access means comprises an arrangement of permanent fixtures arranged on the housing arrangement of the electrical machine,
   wherein the housing arrangement further comprises a sleeve which substantially surrounds the rotatable part of the electrical machine, and
   at least one access platform is arranged on the sleeve,
   wherein the at least one access platform is sized to bear the stature and load of at least one worker,
   wherein the access platform comprises a hatch in the body of the access platform for allowing access between a level below the access platform and a level above the access platform in an interior of the housing arrangement.

2. The housing arrangement according to claim 1, wherein the at least one platform is a permanent fixture of the access means and is arranged on a surface of the sleeve.

3. The housing arrangement according to claim 1, wherein the at least one platform comprises a plurality of access platforms arranged on the sleeve of the stationary housing arrangement.

4. The housing arrangement according to claim 3, wherein an access platform essentially covers an area bounded by the sleeve and interior walls of the stationary housing arrangement.

5. The housing arrangement according to claim 3, wherein an access platform is at least partially tiltable about a horizontal axis.

6. The housing arrangement according to claim 1, comprising a plurality of access openings in a flange of the stationary housing arrangement for allowing worker access from a space on one side of the flange to a space on the other side of the flange.

7. The housing arrangement according to claim 1, comprising an arrangement of rungs and/or steps arranged on the stationary housing arrangement.

8. The housing arrangement according to claim 1, wherein the platform is sized to bear the stature of at least one worker where the at least one worker can fit within an area bounded by the sleeve and interior walls of the housing arrangement.

9. A wind turbine, comprising:
   an electrical machine, the electrical machine comprising:
      a stationary part and a rotatable part,
      an access means arranged in a stationary housing arrangement of the electrical machine, wherein the access means comprises an arrangement of permanent fixtures arranged on the stationary housing arrangement of the electrical machine,
   the arrangement of permanent fixtures including at least one platform,
   wherein the at least one platform is sized to bear the stature and load of at least one worker,
   wherein said access means includes an access platform having a hatch in the body of the access platform, said hatch allowing access between a level below the access platform and a level above the access platform in an interior of the stationary housing arrangement.

10. The wind turbine according to claim 9, wherein the stationary housing arrangement of the electrical machine comprises a sleeve arranged concentrically with the rotatable part, and a permanent fixture is arranged on the sleeve.

11. The wind turbine according to claim 10, wherein a permanent fixture of the access means comprises a plurality of access platforms arranged on the sleeve of the stationary housing arrangement.

12. The wind turbine according to claim 9, wherein the platform is sized to bear the stature of at least one worker where the at least one worker can fit within an area bounded by the sleeve and interior walls of the housing arrangement.

13. The wind turbine according to claim 9, comprising a plurality of access openings in a flange of the stationary housing arrangement for allowing worker access from a space on one side of the flange to a space on the other side of the flange.

* * * * *